(12) United States Patent
Yamaguchi

(10) Patent No.: US 7,523,987 B2
(45) Date of Patent: Apr. 28, 2009

(54) VEHICLE SEAT

(75) Inventor: Hiroyoshi Yamaguchi, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 227 days.

(21) Appl. No.: 11/429,707

(22) Filed: May 8, 2006

(65) Prior Publication Data

US 2006/0202524 A1    Sep. 14, 2006

Related U.S. Application Data

(63) Continuation of application No. PCT/JP2005/015386, filed on Aug. 18, 2005.

(30) Foreign Application Priority Data

Aug. 19, 2004    (JP)    ............................ 2004-239495

(51) Int. Cl.
*B60N 2/42*    (2006.01)
*B60N 2/48*    (2006.01)

(52) U.S. Cl. ................................................. 297/216.12

(58) Field of Classification Search ............ 297/216.12, 297/216.13, 216.14, 410
See application file for complete search history.

(56) References Cited

U.S. PATENT DOCUMENTS

| 5,823,619 | A | * | 10/1998 | Heilig et al. | ............ | 297/216.12 |
| 5,927,804 | A | * | 7/1999 | Cuevas | .................. | 297/216.12 |
| 6,824,212 | B2 | * | 11/2004 | Malsch et al. | .......... | 297/216.12 |
| 7,044,545 | B2 | * | 5/2006 | Ohchi et al. | ............ | 297/216.12 |
| 7,066,545 | B2 | * | 6/2006 | Terada et al. | ................. | 297/410 |
| 7,234,769 | B2 | * | 6/2007 | Takenaka et al. | ........ | 297/216.12 |
| 2004/0119324 | A1 | * | 6/2004 | Humer et al. | .......... | 297/216.12 |

FOREIGN PATENT DOCUMENTS

| DE | 19951967 A1 | * | 5/2001 |
| DE | 10046391 C1 | | 4/2002 |
| DE | 10054826 A1 | | 5/2002 |
| JP | 10138812 | | 5/1998 |
| JP | 11268566 | | 10/1999 |
| JP | 200158533 | | 3/2001 |

(Continued)

OTHER PUBLICATIONS

International Preliminary Report on Patentability for PCT/JP2005/015386 dated Feb. 20, 2007.

(Continued)

*Primary Examiner*—Joseph F Edell
(74) *Attorney, Agent, or Firm*—Ohlandt, Greeley, Ruggiero & Perle, L.L.P.

(57) ABSTRACT

A vehicle seat comprises a head rest tilt mechanism which supports a head rest, a pressure receiving member contained in a seat back, and a speed increasing unit. The pressure receiving member moves rearward when it is pushed by the body of an occupant. The speed increasing unit has a base bracket, first and second arms, a roller, a pulley, etc. A part of a wire is wound in the shape of a U around the pulley. When the pressure receiving member moves rearward, the pulley moves to pull the wire. When the wire is pulled, the head rest tilt mechanism is driven to move a head rest body forward.

7 Claims, 9 Drawing Sheets

FOREIGN PATENT DOCUMENTS

| | | | |
|---|---|---|---|
| JP | 2002160567 | | 6/2002 |
| JP | 2005212596 A | * | 8/2005 |

OTHER PUBLICATIONS

Official Office Action from corresponding European patent application No. 05780923.

PCT International Search Report issued Nov. 15, 2005 by the Japan Patent Office for Int'l Application No. PCT/JP2005/015386.

PCT Written Opinion of The International Searching Authority issued Nov. 15, 2005 by the Japan Patent Office for Int'l Application No. PCT/JP2005/015386.

* cited by examiner

VEHICLE SEAT

CROSS-REFERENCE TO RELATED APPLICATIONS

This is a Continuation Application of PCT Application No. PCT/JP2005/015386, filed Aug. 18, 2005, which was published under PCT Article 21(2) in English.

This application is based upon and claims the benefit of priority from prior Japanese Patent Application No. 2004-239495, filed Aug. 19, 2004, the entire contents of which are incorporated herein by reference.

BACKGROUND OF THE INVENTION

1. Field of the Invention

This invention relates to a vehicle seat having a head restraint apparatus.

2. Description of the Related Art

Proposed is a movable head restraint apparatus in which a head rest can be moved forward to restrain the head of an occupant in case of a rear-end collision of a vehicle or the like. A head restraint apparatus described in Jpn. Pat. Appln. KOKAI Publication No. 11-268566 (patent document 1), for example, comprises a bracket for supporting stays of a head rest and a pressure receiving plate provided on the lower part of the bracket. The bracket rocks back and forth around a shaft that is situated between the head rest and the pressure receiving plate. In the head restraint apparatus of this type, the head rest moves forward if the occupant's body is pressed against a seat back by a collision so that the pressure receiving plate is pushed rearward.

In the head restraint apparatus described in the patent document 1, the amount of forward movement of the head rest is smaller than the amount of movement of the pressure receiving plate. Therefore, the apparatus cannot easily restrain the occupant's head early, so that it can produce only a small injury reduction effect. If the center of rocking motion is lowered, the operating speed of the head rest is increased, so that the occupant's head can be restrained early. In this case, however, the stays of the head rest deeply bend rearward by the load from the occupant's head, so that the injury reduction effect is inevitably lowered. If the stiffness of the stays is enhanced to lessen the deflection of the stays, there arises a problem that the weight of the stays increases.

In a head restraint apparatus described in Jpn. Pat. Appln. KOKAI Publication No. 2001-58533 (patent document 2), a pressure receiving plate is located in the upper part of a seat back. By doing this, the ratio (link ratio) between the distance from the head rest to the center of its rocking motion and the distance from the center of rocking motion of the head rest to the pressure receiving plate is increased.

The head rest described in the patent document 1 is configured so that the head rest and the pressure receiving plate move like a seesaw in opposite directions around an axis between them. Thus, the components of the apparatus tend to increase in size and weight. Further, operation for layout in the seat back is troublesome. In the case of a power seat, moreover, the pressure receiving plate and other moving parts must be arranged lest they interfere with a motor or any other mechanical component of the seat. Thus, the efficiency of layout in the seat back is poor.

Although the pressure receiving plate is located in the upper part of the seat back in the head restraint apparatus described in the patent document 2, it cannot satisfactorily ensure early restraint of the occupant's head. In order to prevent the pressure receiving plate on the upper part of the seat back from causing a foreign body sensation, the pressure receiving plate must be receded as deep behind the seat back as possible in its thickness direction. In this case, there is a problem that the time for the start of operation is delayed.

In the head restraint apparatus described in the patent document 2, the pressure receiving plate is provided in the upper part of the seat back so that it can be pressed by the occupant's back. According to this configuration, compared with a configuration in which the pressure receiving plate is located in the lower part of the seat back, the pressure receiving plate is subjected to a lighter load. Since a seat back frame itself bends rearward and for any other reasons, moreover, the start of operation is inevitably delayed further.

BRIEF SUMMARY OF THE INVENTION

Accordingly, the object of the present invention is to provide a vehicle seat capable of quickly actuating a head rest in case of collision.

A vehicle seat according to the present invention is a vehicle seat which includes a seat back having a seat back frame and a head rest having a head rest body provided on the top of the seat back and stays extending under the head rest body. The vehicle seat comprises a support bracket which supports the stays of the head rest on the seat back frame so that the head rest body is configured to move back and forth, a pressure receiving member which is provided in the seat back and moves rearward when pushed by the body of an occupant, a line member having one end and the other end and located in the seat back, a speed increasing unit which is connected with the one end of the line member and increases the speed corresponding to the motion of the pressure receiving member when the pressure receiving member moves rearward, thereby turning the line member in a direction such that the line member is pulled, and a head rest tilt mechanism which is connected with the other end of the line member and transmits a motion of the line member to the support bracket so that the head rest body moves forward when the line member is pulled.

According to this arrangement, the speed corresponding to the motion of the pressure receiving member is increased by the speed increasing unit when the pressure receiving member is moved rearward by a collision, and the motion is transmitted to the head rest tilt mechanism by the line member, e.g., a wire. Thus, the head of the occupant can be quickly restrained without a delay in operation. Further, the speed increasing unit and the head rest tilt mechanism are connected to each other by the line member. Even if the speed increasing unit and the head rest tilt mechanism are situated at a distance from each other, therefore, they can be made light in weight and easily laid out in the seat back.

One form of the speed increasing unit comprises a base bracket connected with the one end of the line member and a dog-legged link mechanism formed of a first arm and a second arm rockably connected to each other. One end of the first arm of the link mechanism is rockably supported on the base bracket by a first shaft. The first and second arms are rockably connected by a second shaft and project toward the pressure receiving member. An abutting member, which abuts against the pressure receiving member when the pressure receiving member is moved rearward, is provided at a junction between the first and second arms. A pulley, which is rotatable around a third shaft and around which the line member is passed, is mounted on the other end of the second arm. The speed increasing unit further comprises guide means which guides a movement of the pulley so that an angle between the first and second arms increases when the abutting member is pushed rearward by the pressure receiving member.

An example of the abutting member is a roller configured freely to rotate around the second shaft.

An example of the guide means is a guide hole which is formed in the base bracket and in which the third shaft is inserted.

An example of the guide hole has a first portion situated closer to the first shaft and a second portion remoter from the first shaft, the first portion having a shape such as to incline rearward at an angle to an extension which connects the first shaft and the third shaft.

Another form of the speed increasing unit comprises a base bracket provided on the seat back frame and connected with the one end of the line member, a pulley which is provided for rotation on the base bracket and around which a part of the line member is passed, an intermediate pulley which is located between the one end of the line member and the pulley and laterally pushes the line member, thereby warping a part of the line member in the shape of a U, and a transmission member which transmits a motion of the pressure receiving member to the intermediate pulley so that the intermediate pulley moves rearward when the pressure receiving member is pushed rearward.

In this form, the vehicle seat may further comprise a first link provided on the base bracket and a second link as the transmission member provided on the first link. The second link may have a roller on one end portion thereof opposite the pressure receiving member and be mounted with the intermediate pulley on the other end portion. Alternatively, the pressure receiving member may be provided with an arm bracket on which the intermediate pulley is mounted.

For example, the speed increasing unit is located on the seat back frame in a horizontal posture such that the longitudinal direction of the base bracket is horizontal. Alternatively, it is located on the seat back frame in a vertical posture such that the longitudinal direction of the base bracket is vertical.

For example, the line member may be composed of a single cable connected to the speed increasing unit and two cables which bifurcate from the cable and are connected individually to left- and right-hand head rest tilt mechanisms via guide members such as pulleys, and a load from the speed increasing unit may be transmitted simultaneously to the two cables when the single cable is pulled by the speed increasing unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 5.

Figure 1:
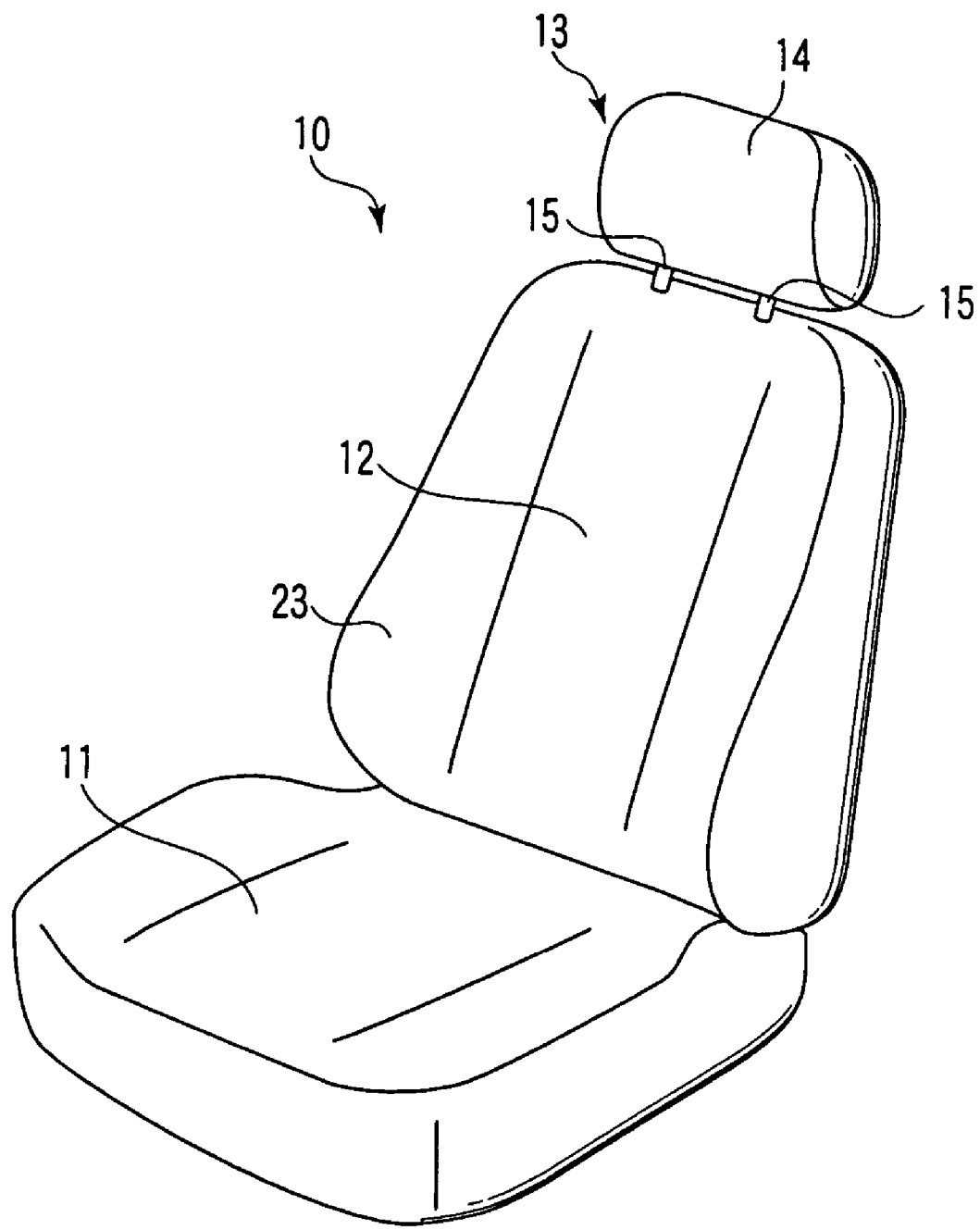
FIG. 1 is a perspective view of a vehicle seat according to a first embodiment of the invention.

FIG. 1 shows a vehicle seat 10 having a head restraint apparatus. The seat 10 comprises a seat cushion 11, a seat back 12, and a head rest 13. The head rest 13 has a head rest body 14 provided on the top of the seat back 12 and left- and right-hand stays 15 that extend under the head rest body 14.

Figure 2:
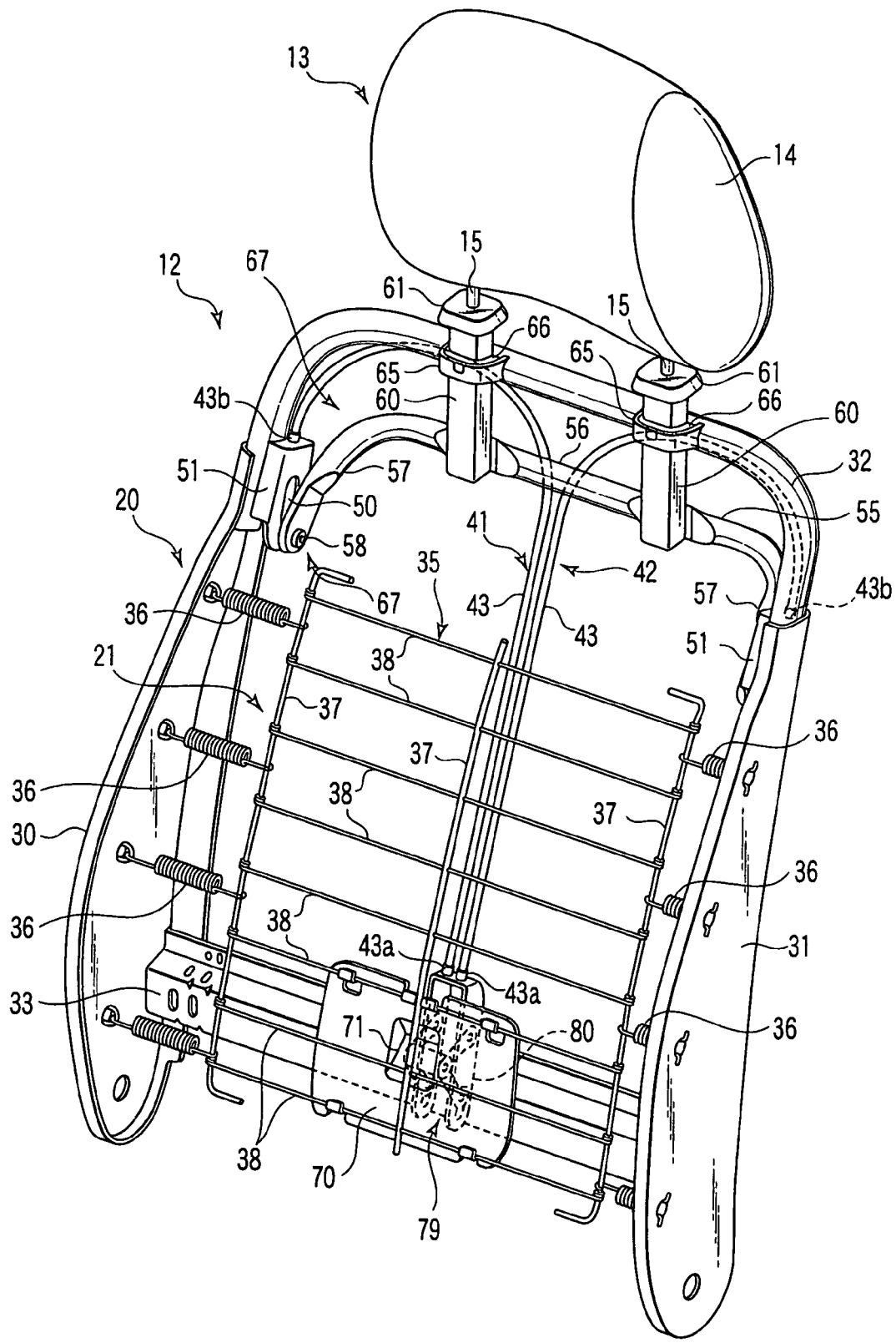
FIG. 2 is a perspective view showing the interior of a seat back of the vehicle seat shown in FIG. 1.
Figure 3:
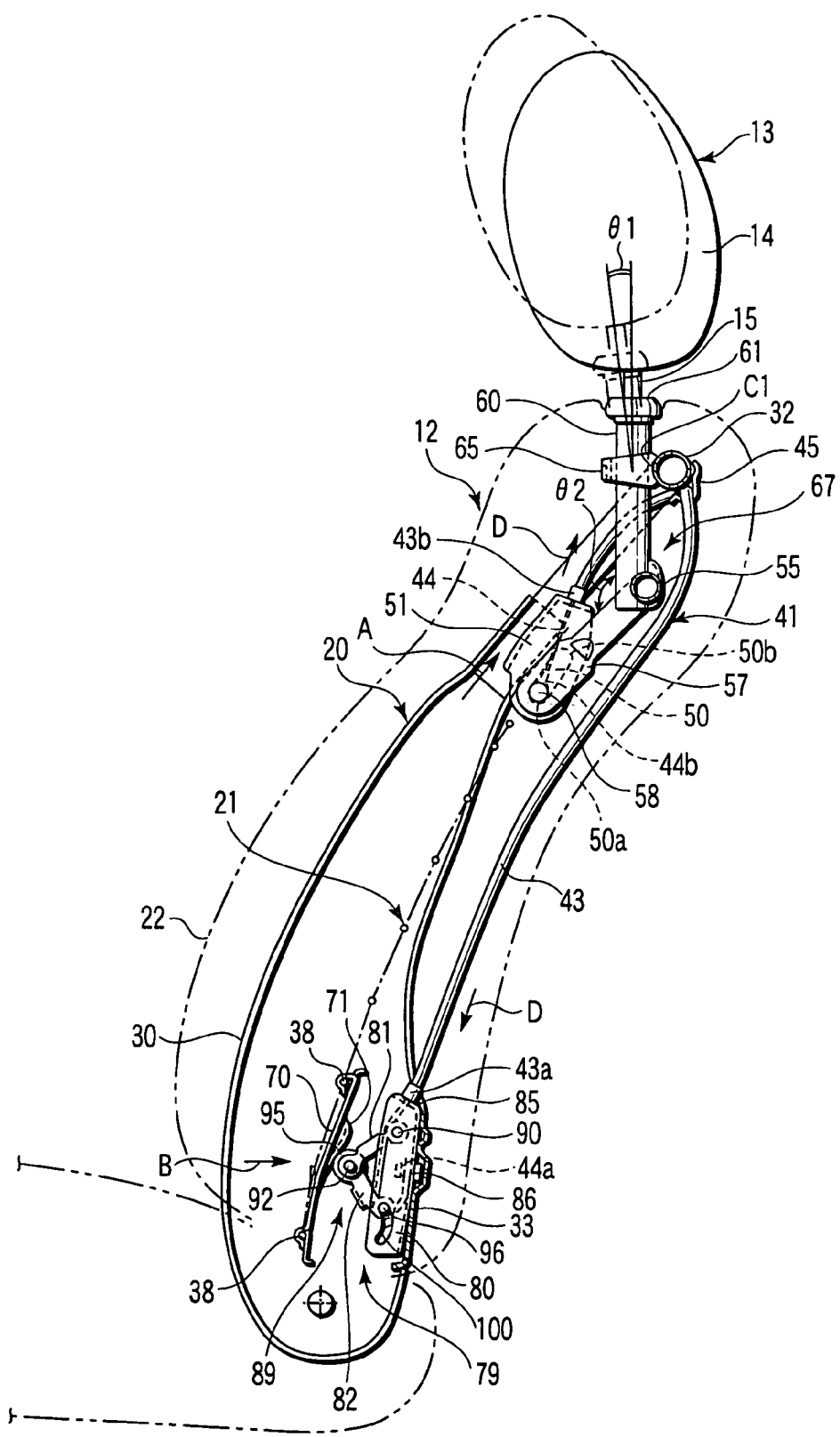
FIG. 3 is a side view showing the interior of the seat back of the seat shown in FIG. 1.

FIGS. 2 and 3 show the interior of the seat back 12. The seat back 12 has a seat back frame 20, a spring assembly 21, a pad member 22 (indicated by two-dot chain line in FIG. 3) located so as to cover the spring assembly 21, a cover member 23 (FIG. 1) that covers the outer surface of the pad member 22, and the like.

The seat back frame 20 is composed of left- and right-hand side frame members 30 and 31, an upper frame member 32 situated on the upper side, a lower frame member 33 on the lower side, etc. The side frame members 30 and 31 and the lower frame member 33 are formed in given shapes by press-molding metal plates. The upper frame member 32 is formed of, e.g., a pipe, and its opposite ends are welded individually to the respective top portions of the side frame members 30 and 31. The opposite ends of the lower frame member 33 are welded individually to the respective bottom portions of the side frame members 30 and 31.

An example of the spring assembly 21 is composed of a flat spring 35, a plurality of tension springs 36, etc. The flat spring 35 is composed of longitudinal wires 37 extending in the vertical direction and cross wires 38 extending in the horizontal direction. The opposite side portions of the flat spring 35 are supported individually on the side frame members 30 and 31 by the tension springs 36.

Figure 4:
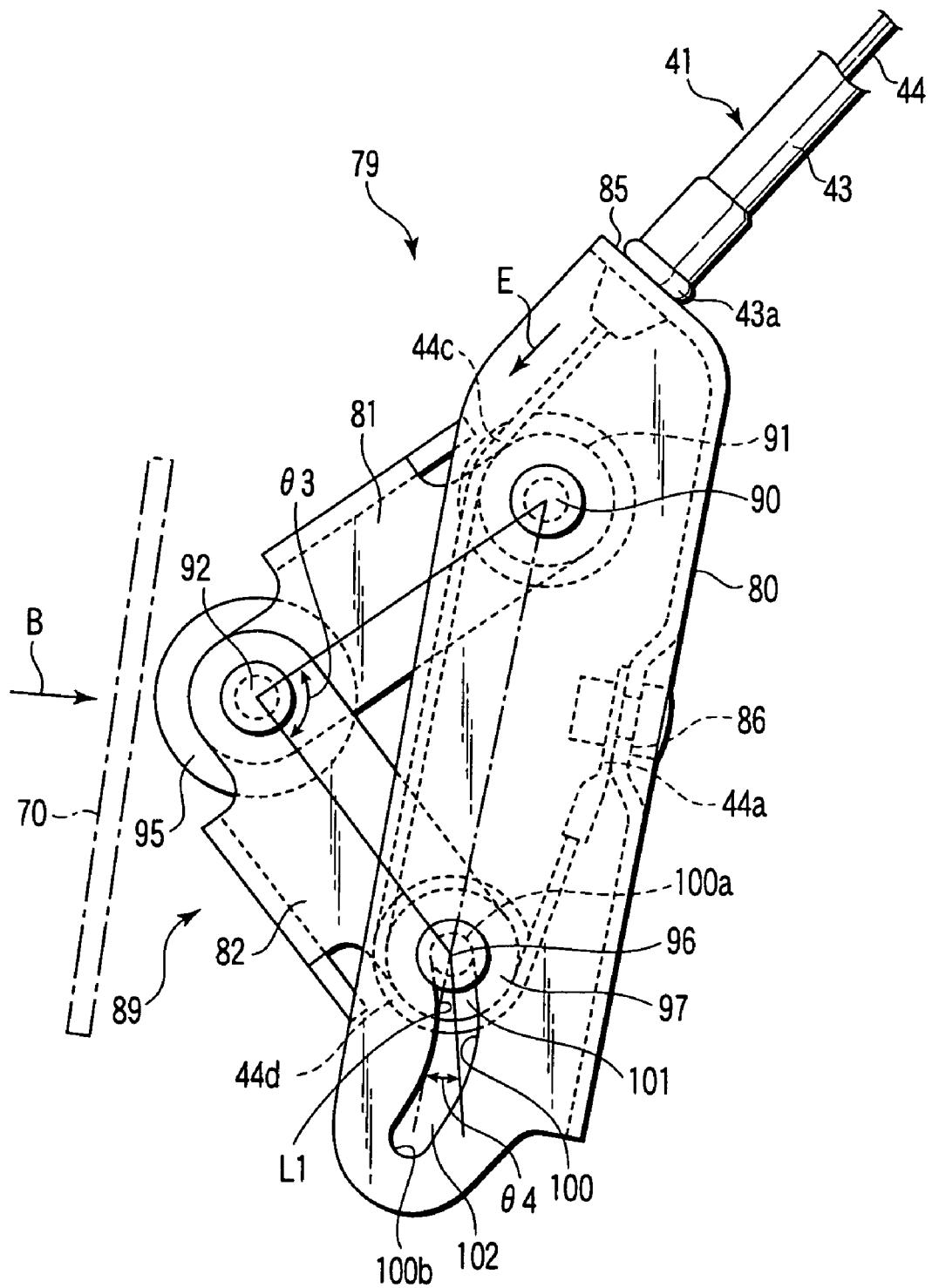
FIG. 4 is a side view of a speed increasing unit used in the seat shown in FIG. 1.

As shown in FIG. 2, cables 41 and 42 of two systems are arranged in the seat back 12. FIGS. 3 and 4 show the one cable 41 as a representative. Each of the cables 41 and 42 has an outer tube 43 and a wire 44 inserted in the outer tube 43. A longitudinally intermediate portion of each of the cables 41 and 42 is supported on, for example, the upper frame member 32 by a retainer 45 (FIG. 3).

The wire 44 is an example of a line member according to the present invention. As shown in FIGS. 2 and 3, the outer tube 43 has one end 43a and the other end 43b. The wire 44 also has one end 44a and the other end 44b.

As shown in FIGS. 2 and 3, a bracket 51 having a guide hole 50 is provided on each end portion of the upper frame member 32. The guide hole 50 has an inclined shape such that its front end 50a is situated below its rear end 50b. A sub-frame 55 is provided between the paired brackets 51.

The sub-frame 55 comprises a horizontally extending cross portion 56 and a pair of arm portions 57 formed individually on the opposite ends of the cross portion 56. The arm portions 57 extend diagonally downward and forward from their corresponding ends of the cross portion 56. A slide pin 58 is provided on an end of each arm portion 57. The pin 58 is inserted in the guide hole 50 of each bracket 51 so that it can move along the hole 50 between its front and rear ends 50a and 50b.

Left- and right-hand support brackets 60 are fixed to the cross portion 56 of the sub-frame 55. Each support bracket 60 is tubular and has a grommet 61 on its upper end. Guide brackets 65 are provided on the upper frame member 32. The upper part of each support bracket 60 is supported on the upper frame member 32 by each corresponding guide bracket 65. Each guide bracket 65 is provided with a plastic slide guide member 66 in a region where it touches its corresponding support bracket 60.

The support brackets 60 can smoothly slide in the vertical direction with respect to the upper frame member 32 with the aid of the slide guide members 66. Besides, each support bracket 60 is rockably supported so that it can tilt back and forth within a certain angular range $\theta 1$ around a point C1 of contact with the upper frame member 32 (FIG. 3).

Thus, the brackets 51 each having the guide hole 50, sub-frame 55, slide pins 58, support brackets 60, guide brackets 65, etc. constitute a head rest tilt mechanism 67, which supports the head rest 13 so that it can tilt back and forth.

In the head rest tilt mechanism 67, the positions of the contact point C1 and each slide pin 58, the length of each arm portion 57 of the sub-frame 55, an angle $\theta 2$ (FIG. 3) between each arm portion 57 and its corresponding support bracket 60 are set so that the support bracket 60 moves upward as it tilts forward when each slide pin 58 is moved diagonally upward and rearward (in the direction indicated by arrow A in FIG. 3) along its corresponding guide hole 50.

Each stay 15 of the head rest 13 is inserted into the support bracket 60 through a hole in the grommet 61. It is vertically movable with respect to the support bracket 60. When the head rest body 14 is adjusted to a desired height, the stay 15 can be fixed to the support bracket 60 by a locking mechanism (not shown).

A pressure receiving member 70 is provided in the seat back 12 so as to be situated on the lower part of the spring assembly 21, that is, behind the lumbar region of an occupant (seater). The pressure receiving member 70 is attached to the spring assembly 21. If the spring assembly 21 is pushed and bent rearward by the occupant's body, the pressure receiving member 70, along with the spring assembly 21, can move from a front position toward a rear position. A rearwardly projecting press portion 71 is formed on a part of the pressure receiving member 70.

A speed increasing unit 79 is provided in a position opposite the rear surface of the pressure receiving member 70. The speed increasing unit 79, head rest 13, wire 44 as a line member, head rest tilt mechanism 67, etc. constitute the head restraint apparatus.

The speed increasing unit 79 has a base bracket 80 fixed to the lower frame member 33 and first and second arms 81 and 82 attached to the base bracket 80. The speed increasing unit 79 is located on the lower frame member 33 so that the first and second arms 81 and 82 are situated on the upper and lower sides, respectively, and vertically arranged in a tandem or that the longitudinal direction of the base bracket 80 is vertical.

Figure 5:
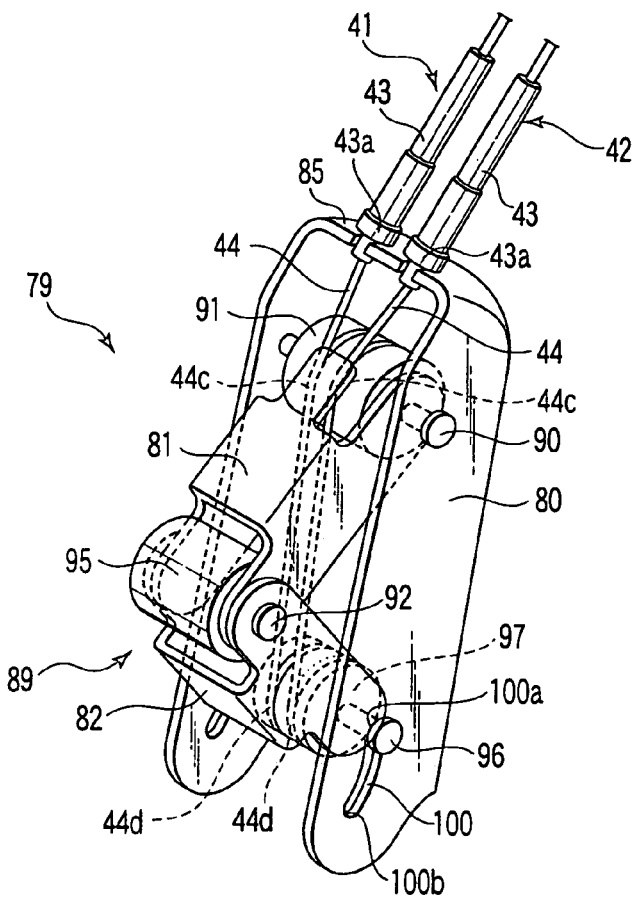
FIG. 5 is a perspective view of the speed increasing unit used in the seat shown in FIG. 1.

As shown in FIGS. 4 and 5, the one end 43a of the outer tube 43 of each of the cables 41 and 42 is connected to a cable supporting portion 85 of the base bracket 80. The one end 44a of the wire 44 of each of the cables 41 and 42 is connected to a wire supporting portion 86 of the base bracket 80.

One end (upper end) of the first arm 81 is rockably supported on the base bracket 80 by a first pin 90. The first pin 90 is an example of a first shaft. The base bracket 80 is provided with a guide pulley 91 that is rockable around the first pin 90.

The first and second arms 81 and 82 are rockably connected to each other by a second pin 92 so that they form a fallen V, as viewed laterally. In other words, the first and second arms 81 and 82 constitute a dog-legged link mechanism 89. They project toward the pressure receiving member 70. Preferably, an angle $\theta 3$ between the first and second arms 81 and 82 is 90 degrees or more (obtuse angle). The second pin 92 is an example of a second shaft.

A roller 95 is provided at the junction between the first and second arms 81 and 82. It is an example of an abutting member. The roller 95 is rotatable around the second pin 92. It is located so as to face the press portion 71 that projects from the rear surface of the pressure receiving member 70. When the member 70 moves rearward (direction indicated by arrow B in FIGS. 3 and 4), the press portion 71 abuts against the roller 95.

A third pin 96 and a pulley 97, which is rotatable around the third pin 96, are provided on the other end (lower end) of the second arm 82. The third pin 96 is an example of a third shaft. It is inserted into a guide hole 100 in the base bracket 80 so that it can move along the hole 100 in its longitudinal direction.

The third pin 96 and the guide hole 100 constitute guide means. The guide means guides the movement of the pulley 97 so that the angle $\theta 3$ between the first and second arms 81 and 82 increases when the roller 95 is pushed rearward by the pressure receiving member 70.

When the roller 95 is pushed in the direction of arrow B of FIG. 4 by the pressure receiving member 70, the angle $\theta 3$ between the first and second arms 81 and 82 increases. Since the first pin 90 is supported on the base bracket 80, the third pin 96 moves from one end (upper end) 100a to the other end (lower end) 100b of the guide hole 100. Accordingly, the distance from the first pin 90 to the third pin 96 increases gradually. Thus, the pulley 97 moves downward along the guide hole 100.

The guide hole 100 will now be described in detail with reference to FIG. 4.

The guide hole 100 has a first portion 101 situated closer to the first pin 90 and a second portion 102 remoter from the pin 90. The first portion 101 extends diagonally downward and rearward at an angle $\theta 4$ to an extension L1 that connects the first and third pins 90 and 96. The second portion 102 is bent on the opposite side (diagonally downward and forward) of the extension L1 with respect to the first portion 101.

Thus, the first portion 101 of the guide hole 100 is inclined at the angle $\theta 4$ to the extension L1 that connects the first and third pins 90 and 96. The second portion 102 extends along the extension L1. When the pulley 97 moves along the guide hole 100 from its one end 100a toward the other end 100b, therefore, the third pin 96 can easily move along the first portion 101. The pulley 97 moves faster when the third pin 96 moves along the second portion 102 than when it moves along the first portion 101.

As shown in FIG. 4, a part 44c of the wire 44 of each of the paired cables 41 and 42 is in contact with a part of the guide pulley 91. A part 44d of each wire 44 on the other end side thereof is wound for about a half turn around the pulley 97 that underlies the guide pulley 91. In other words, the one end 44a of each wire 44 is fixed to the wire supporting portion 86 of the base bracket 80 with the part 44d on the other end side U-turned for about 180 degree by the pulley 97.

If the pulley 97 moves along the guide hole 100 from its one end 100a toward the other end 100b, therefore, the pulley 97 moves downward like a running block. Thereupon, each wire 44 is pulled for a length equivalent to twice the distance of movement of the pulley 97. When the pressure receiving member 70 moves rearward (in the direction of arrow B), in other words, the speed corresponding to the motion of the pressure receiving member 70 is increased by the speed increasing unit 79, so that the wire 44 can be pulled quickly.

The other end 44b (FIG. 3) of the wire 44 of each of the cables 41 and 42 is connected to each corresponding slide pin 58 of the head rest tilt mechanism 67. If each wire 44 is pulled in the direction indicated by arrow D in FIG. 3 by the speed increasing unit 79, therefore, each slide pin 58 of the head rest tilt mechanism 67 moves in the direction indicated by arrow A.

The following is a description of the operation of the vehicle seat 10 constructed in this manner.

When the occupant's body is pressed against the seat back 12 at the time of collision, the pressure receiving member 70 is pushed rearward by a load from the lumbar region of the occupant that acts on the seat back 12. Thereupon, the pressure receiving member 70 pushes the roller 95 of the speed increasing unit 79, so that the second arm 82 moves in a direction such that the angle θ3 (FIG. 4) between the first and second arms 81 and 82 increases.

As this is done, the third pin 96 moves downward along the guide hole 100, so that the pulley 97 moves downward. The wires 44 of the cables 41 and 42 are wound in the shape of a U for about a half turn around the pulley 97. Therefore, they are pulled at a speed about twice as high as the movement speed of the pulley 97 in the direction indicated by arrow E in FIG. 4 by the so-called principle of a running block. Thereupon, the slide pins 58 of the head rest tilt mechanism 67 move in the direction indicated by arrow A in FIG. 3.

The first portion 101 of the guide hole 100 is inclined rearward at the angle θ4 to the extension L1 that connects the first and third pins 90 and 96. When the roller 95 is pushed in the direction of arrow B, therefore, the third pin 96 initially moves a little rearward along the first portion 101 as it moves downward. Thus, the wires 44 can be easily drawn out of the outer tubes 43.

Since the third pin 96 moves along the second portion 102, thereafter, the wires 44 are drawn out at a higher speed. The guide hole 100 can adjust the speed at which the wires 44 are drawn out by changing the tilt angle θ4 of the first portion 101 or changing an angle of the second portion 102 to the first portion 101.

As the wires 44 of the cables 41 and 42 are simultaneously pulled by the speed increasing unit 79, the slide pins 58 of the head rest tilt mechanism 67 move diagonally upward and rearward (in the direction indicated by arrow A in FIG. 3) along their corresponding guide holes 50. As the arm portions 57 of the sub-frame 55 then move upward and rearward, the support brackets 60 move so as to fall down forward around the contact point C1 while ascending, so that the head rest body 14 moves forward. As this is done, the head of the occupant can be quickly restrained by the head rest body 14.

In the vehicle seat 10 of the present embodiment, a rearward movement of the pressure receiving member 70 is transmitted from the speed increasing unit 79 to the head rest tilt mechanism 67 through the respective wires 44 of the cables 41 and 42. Even if the distance from the speed increasing unit 79 to the tilt mechanism 67 is long, therefore, the movement of the pressure receiving member 70 can be quickly transmitted to the tilt mechanism 67 by the wires 44.

Thus, if the distance from the speed increasing unit 79 to the head rest tilt mechanism 67 is relatively long, the entire apparatus, including the pressure receiving member 70 and the tilt mechanism 67, can be made light in weight. Further, the speed increasing unit 79 and the tilt mechanism 67 can be easily laid out in the seat back 12.

In the vehicle seat 10 of the present embodiment, moreover, the speed corresponding to the movement of the pressure receiving member 70 at the time of collision is increased by the speed increasing unit 79, and the head rest tilt mechanism 67 is actuated by the wires 44. Thus, the response is high, and the operation suffers no delay. Since the speed increasing unit 79 is constructed independently of the pressure receiving member 70, it can be efficiently attached to the seat back frame 20.

Figure 6:
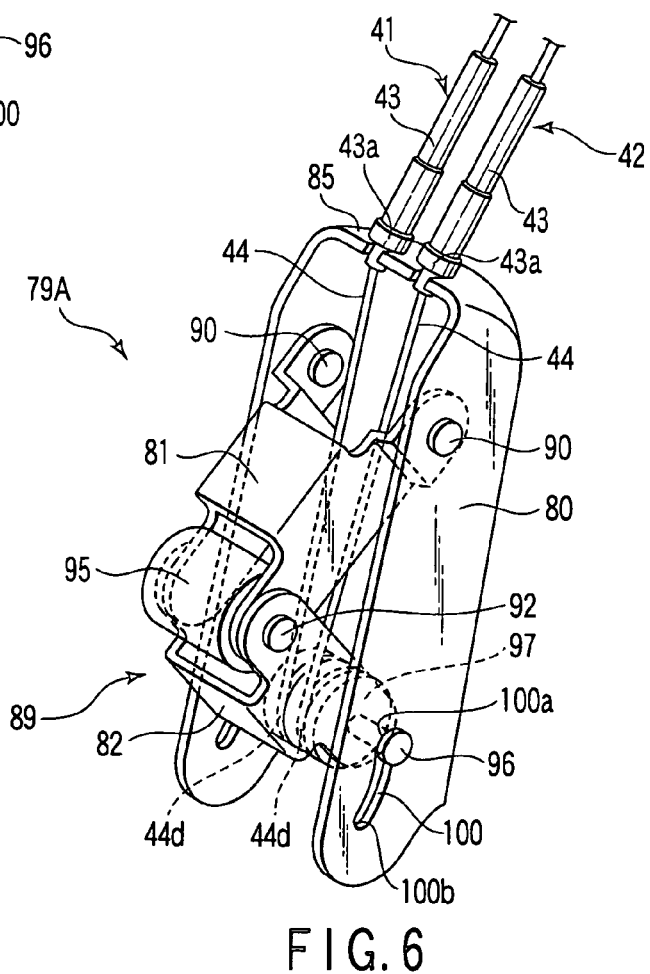
FIG. 6 is a perspective view of a speed increasing unit according to a second embodiment of the invention.
Figure 7:
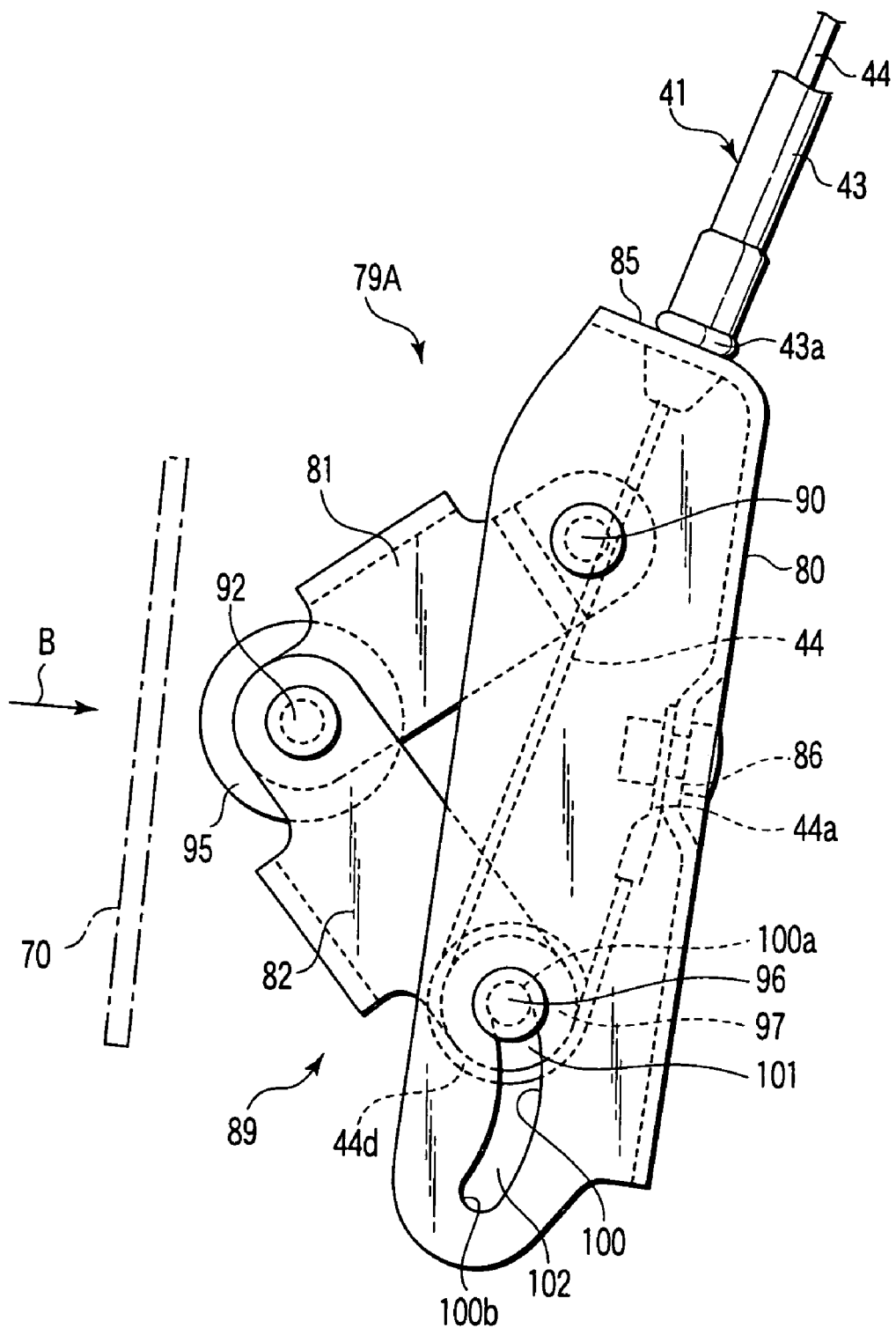
FIG. 7 is side view of the speed increasing unit shown in FIG. 6.

FIGS. 6 and 7 show a speed increasing unit 79A according to a second embodiment of the invention. In this speed increasing unit 79A, the guide pulley 91 used in the first embodiment is omitted, and wires 44 that are drawn out individually from respective one ends 43a of outer tubes 43 of cables 41 and 42 are wound directly around a pulley 97. The wires 44 are U-turned for about 180 degree by the pulley 97, and one end 44a of each wire 44 is connected to a wire supporting portion 86 of a base bracket 80. Other configurations, functions, and effects of the speed increasing unit 79A are the same as those of the speed increasing unit 79 of the first embodiment. Therefore, common numerals are used to designate common portions of the two embodiments, and a description of those portions is omitted.

Figure 8:
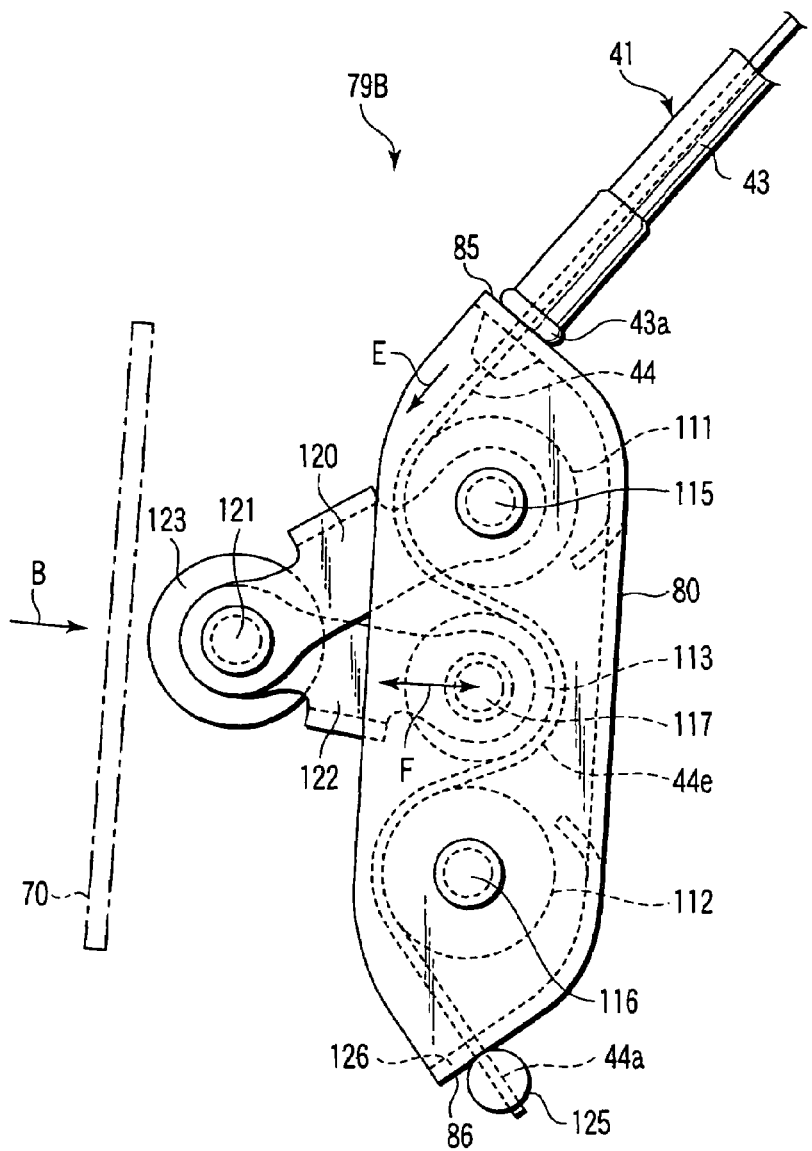
FIG. 8 is a side view of a speed increasing unit according to a third embodiment of the invention.
Figure 9:
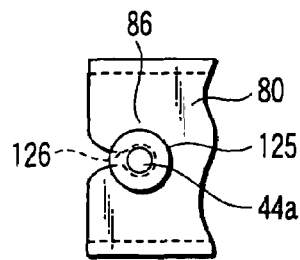
FIG. 9 is a bottom view of a part of the speed increasing unit shown in FIG. 8.

FIGS. 8 and 9 show a speed increasing unit 79B according to a third embodiment of the invention. Common numerals are used to designate common portions of the speed increasing unit 79B and the speed increasing units 79 and 79A of the first and second embodiments, and a description of those portions is omitted. The following is a description of different portions.

As shown in FIG. 8, a base bracket 80 is provided with a first pulley 111 and a second pulley 112. An intermediate pulley 113 is located between the first and second pulleys 111 and 112. Both a shaft 115 of the first pulley 111 and a shaft 116 of the second pulley 112 are supported by the base bracket 80. A shaft 117 of the intermediate pulley 113 can move back and forth (in the direction indicated by arrow F in FIG. 8) with respect to the base bracket 80.

A first link 120 is rockably mounted on the shaft 115 of the first pulley 111. A second link 122 is rockably mounted on an end portion of the first link 120 by a shaft 121. A roller 123 that rotates around the shaft 121 is provided on one end portion of the second link 122. The intermediate pulley 113 and the shaft 117 are mounted on the other end portion of the second link 122. The second link 122 serves as a transmission member that transmits a force in the direction of arrow B to be applied to the roller 123 to the intermediate pulley 113.

A wire 44 that is drawn out from one end 43a of an outer tube 43 of a cable 41 is passed around the front side of the respective peripheral surfaces of the first and second pulleys 111 and 112 and around the rear side of the peripheral surface of the intermediate pulley 113. Thus, a part 44e of the wire 44 between the first and second pulleys 111 and 112 is warped substantially in the shape of a U as it is pushed by the intermediate pulley 113 in the lateral direction of the wire 44.

A terminal member 125 is attached to one end 44a of the wire 44. As shown in FIG. 9, a groove 126 is formed in a wire supporting portion 86 of the base bracket 80. The one end 44a of the wire 44 is inserted in the groove 126 and prevented from slipping off by the terminal member 125. Thus, the one end 44a of the wire 44 is supported by the base bracket 80.

The following is a description of the operation of the speed increasing unit 79B constructed in this manner.

If a load from the lumbar region of the occupant acts on a pressure receiving member 70 at the time of collision, the pressure receiving member 70 moves rearward (in the direction indicated by arrow B in FIG. 8). Thereupon, the roller 123 is pushed rearward, and its motion is transmitted to the intermediate pulley 113 through the second link 122, so that the intermediate pulley 113 moves linearly rearward. When the intermediate pulley 113 moves rearward, the part 44e of the wire 44 between the pulleys 111 and 112, which is passed around the intermediate pulley 113, is pulled at a speed higher than the movement speed of the pulley 113 in the direction of arrow E by the so-called principle of a running block.

Thus, also in the case the speed increasing unit 79B of the present embodiment, the wire 44 can be pulled with the speed of the motion of the pressure receiving member 70 increased, whereby a head rest tilt mechanism 67 (FIGS. 2 and 3) similar to the one according to the first embodiment can be driven. In consequence, the head of the occupant can be quickly restrained without a delay in operation.

Also in this embodiment, the speed increasing unit 79B is constructed independently of the pressure receiving member 70, it can be efficiently attached to a seat back frame 20. When the intermediate pulley 113 moves rearward, only a part of the wire 44 is wound on the second pulley 112. Therefore, the second pulley 112 may be replaced with a non-rotatable drum-shaped member.

Figure 10:
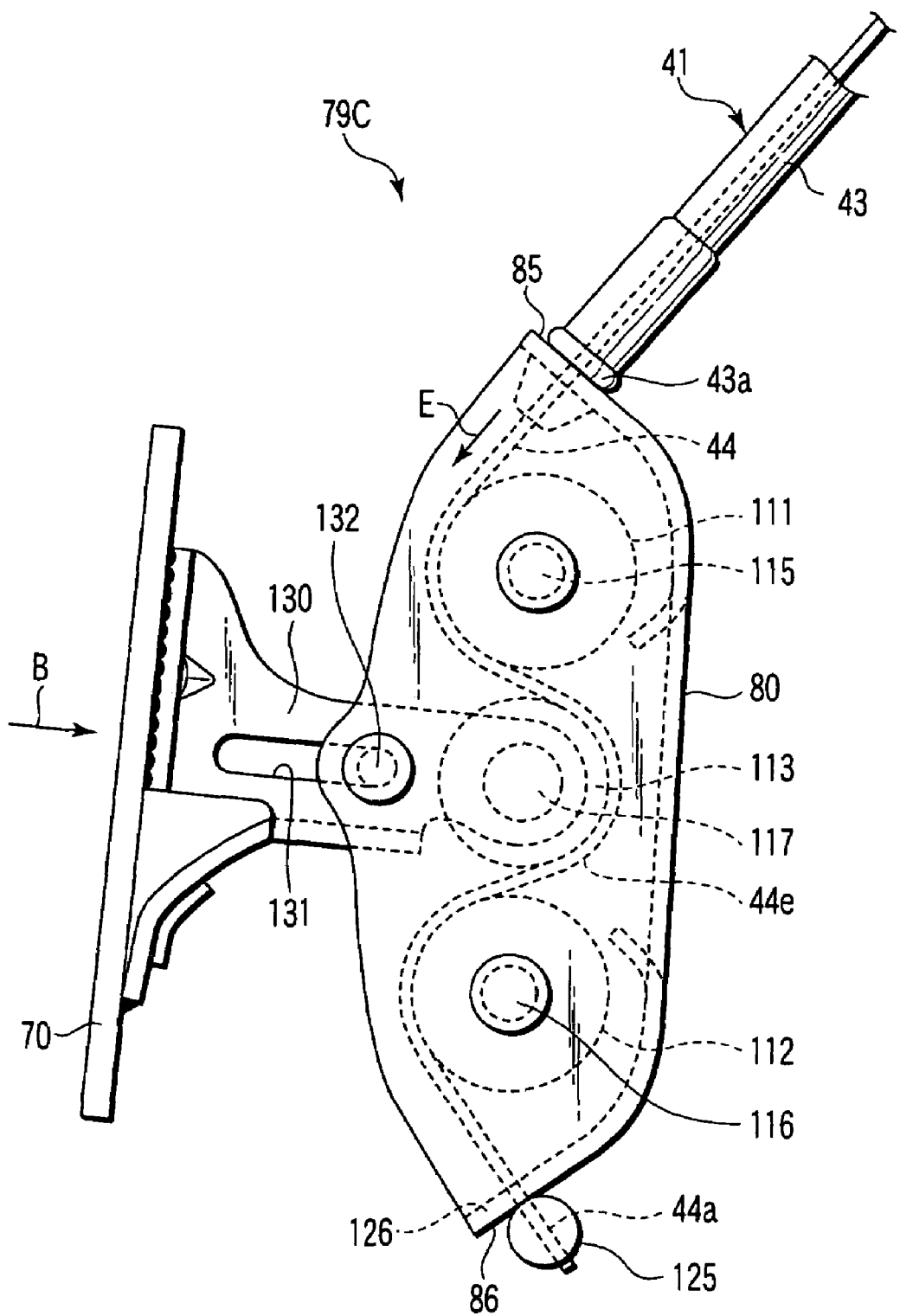
FIG. 10 is a side view of a speed increasing unit according to a fourth embodiment of the invention.

FIG. 10 shows a speed increasing unit 79C according to a fourth embodiment of the invention. Common numerals are used to designate common portions of the speed increasing unit 79C and the speed increasing units 79B of the third embodiment, and a description of those portions is omitted. The following is a description of different portions.

A pressure receiving member 70 of this embodiment is provided with an arm bracket 130. The bracket 130 serves as a transmission member that transmits a force in the direction of arrow B to be applied to the pressure receiving member 70 to an intermediate pulley 113. The arm bracket 130 is formed having a slot 131 that extends back and forth. It is fixed to the pressure receiving member 70 by welding or plastic working, such as caulking.

A base bracket 80 is provided with a pin 132. The pin 132 is inserted in a slot 131. The pin 132 can relatively move back and forth along the slot 131. The intermediate pulley 113 and a shaft 117 are provided on an end portion of the arm bracket 130. Thus, the intermediate pulley 113, along with the arm bracket 130, can linearly move back and forth along the slot 131 with respect to the base bracket 80.

The following is a description of the operation of the speed increasing unit 79C constructed in this manner.

If the pressure receiving member 70 is pushed rearward (in the direction indicated by arrow B in FIG. 10) by a load from the lumbar region of the occupant that acts it at the time of collision, the intermediate pulley 113, along with the arm bracket 130, moves linearly rearward (in the direction of arrow B). When the intermediate pulley 113 in this manner, a wire 44 is pulled at a speed about twice as high as the movement speed of the pulley 113 in the direction indicated by arrow E in FIG. 10 by the so-called principle of a running block. Thus, also in the case of the speed increasing unit 79C of the present embodiment, the wire 44 can be quickly pulled with the speed of the motion of the pressure receiving member 70 increased.

In each of the foregoing embodiments, the speed increasing unit 79, 79A, 79B or 79C is located in a vertical posture on the lower frame member 33 (so that the longitudinal direction of the base bracket 80 is vertical).

Figure 11:
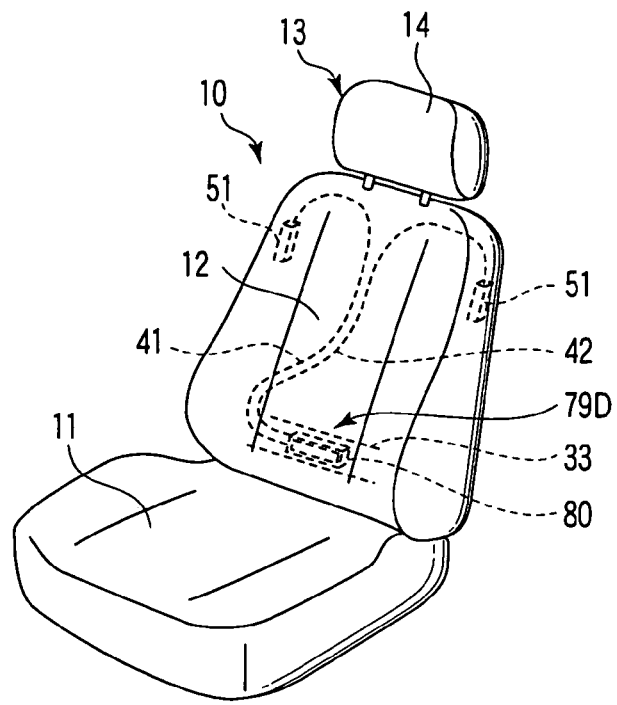
FIG. 11 is a perspective view of a seat showing an example of a layout of a speed increasing unit according to a fifth embodiment of the invention.

In carrying out this invention, however, a speed increasing unit 79D may alternatively be located in a horizontal posture on a lower frame member 33 (so that the longitudinal direction of a base bracket 80 is horizontal), as in a fifth embodiment shown in FIG. 11, for example. In this case, the cables 41 and 42 are drawn out substantially horizontally (or laterally) from the speed increasing unit 79D. If the base bracket 80 is thus located sideways, the speed increasing unit 79D can be easily mounted on the lower frame member 33 and laid out in the seat back 12.

Figure 12:
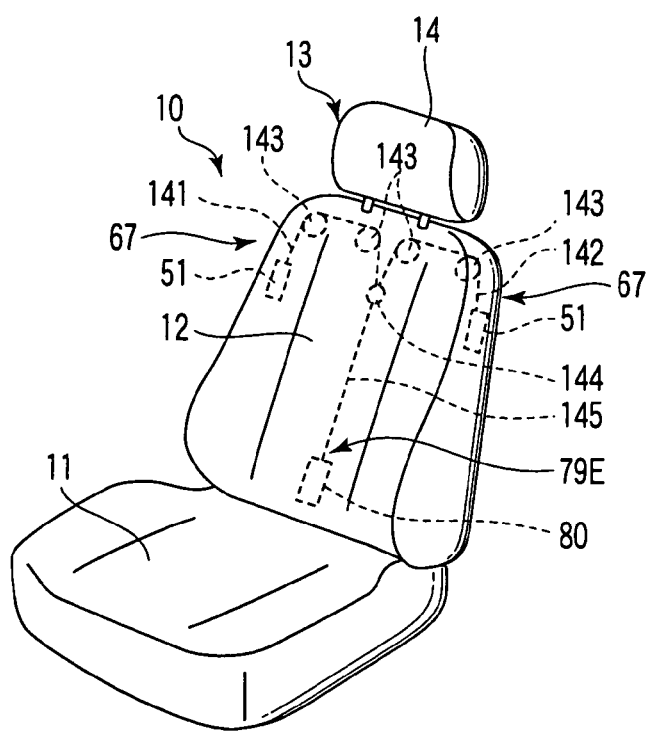
FIG. 12 is a perspective view of a seat showing an example of a layout of a speed increasing unit according to a sixth embodiment of the invention.

FIG. 12 shows a sixth embodiment of the invention. A line member of this embodiment comprises a pair of cables 141 and 142 connected individually to left- and right-hand head rest tilt mechanisms 67, guide members 143 such as pulleys, and a single cable 145 connected to a relay portion 144. In other words, the line member includes the cable 145 connected to a speed increasing unit 79E and the two cables that bifurcate from the cable 145 and are connected individually to the head rest tilt mechanisms 67 via the guide members 143. The speed increasing unit 79E is located in a vertical posture on a seat back frame (so that the longitudinal direction of a base bracket 80 is vertical).

In the case of this embodiment, a load from the speed increasing unit 79E is transmitted simultaneously to the two cables 141 and 142 by the single cable 145. When the two head rest tilt mechanisms 67 are then actuated simultaneously, a head rest ascends as it falls down forward. According to this embodiment, the load from the speed increasing unit 79E can be transmitted to the left- and right-hand tilt mechanisms 67 in a balanced way. Further, the necessary amount of the expensive line member (cable) to be used is small, and the resistance lowers during the operation of the line member.

According to the present invention, the line member that connects the speed increasing unit and the head rest tilt mechanism may be a wire rope formed of a plurality of strands or a single-strand wire. Alternatively, it may be a string- or belt-shaped member. In short, any of elongate strong members that can transmit a pulling force may be used as the line member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle seat which includes a seat back having a seat back frame and a head rest having a head rest body provided on the top of the seat back and a stay extending under the head rest body, comprising:

a support bracket which supports the stay of the head rest on the seat back frame so that the head rest body is configured to move back and forth;

a pressure receiving member which is provided in the seat back and moves rearward when pushed by the body of an occupant;

a line member having one end and the other end and located in the seat back;

a speed increasing unit which is connected with the one end of the line member and increases the speed corresponding to the motion of the pressure receiving member when the pressure receiving member moves rearward, thereby turning the line member in a direction such that the line member is pulled; and a head rest tilt mechanism which is connected with the other end of the line member and transmits a motion of the line member to the support bracket so that the head rest body moves forward when the line member is pulled, wherein the speed increasing unit comprises a base bracket provided on the seat back frame and connected with the one end of the line member, a dog-legged link mechanism formed of a first arm and a second arm rockably connected to each other, one end of the first arm being rockably supported by a first shaft on the base bracket, the first and second arms being rockably connected by a second shaft and projecting toward the pressure receiving member, an abutting member provided at a junction between the first and second arms and abuts against the pressure receiving member when the pressure receiving member is moved rearward, a pulley that is mounted on the other end of the second arm and is rotatable around a third shaft on the second arm and around which the line member is passed, and guide means that guides a movement of the pulley so that an angle between the first and second arms increases when the abutting member is pushed rearward by the pressure receiving member.

2. A vehicle seat according to claim 1, wherein the abutting member is a roller configured freely to rotate around the second shaft.

3. A vehicle seat according to claim 1, wherein the guide means is a guide hole which is formed in the base bracket and in which the third shaft is inserted.

4. A vehicle seat according to claim 3, wherein the guide hole has a first portion situated closer to the first shaft and a second portion remoter from the first shaft, the first portion having a shape so as to incline rearward at an angle to an extension which connects the first shaft and the third shaft.

5. A vehicle seat according to claim 3, wherein the speed increasing unit is located on the seat back frame in a horizontal posture such that the longitudinal direction of the base bracket is horizontal.

6. A vehicle seat according to claim 3, wherein the speed increasing unit is located on the seat back frame in a vertical posture such that the longitudinal direction of the base bracket is vertical.

7. A vehicle seat according to claim 1, wherein the line member is composed of a single cable connected to the speed increasing unit and two cables which bifurcate from the cable and are connected individually to left- and right-hand head rest tilt mechanisms via guide members such as pulleys, and a load from the speed increasing unit is transmitted simultaneously to the two cables when the single cable is pulled by the speed increasing unit so that the head rest falls down forward while ascending when the head rest tilt mechanisms are actuated simultaneously.

* * * * *